United States Patent
Monahan et al.

[11] Patent Number: 5,928,083
[45] Date of Patent: Jul. 27, 1999

[54] ONE-WAY OVER-RUNNING FLEX COUPLING

[75] Inventors: Russell E. Monahan; Thomas W. Houtman, both of Ann Arbor; Thomas E. Vesbit, Grand Rapids; Randall K. King, Southfield, all of Mich.; Mark D. Solvie, Maple Lake, Minn.

[73] Assignee: NTN Corporation, Osaka, Japan

[21] Appl. No.: 08/948,096

[22] Filed: Oct. 9, 1997

[51] Int. Cl.⁶ .................................. F16D 3/52; F16D 3/78
[52] U.S. Cl. ........................... 464/57; 192/41.5; 464/93; 464/60
[58] Field of Search .................. 464/57, 60, 92, 464/93, 87, 160, 147, 182; 192/55.3, 55.6, 41 S, 81 C, 113.32

[56] References Cited

U.S. PATENT DOCUMENTS

| | | | |
|---|---|---|---|
| 881,865 | 3/1908 | Nichols | 464/57 |
| 1,323,850 | 12/1919 | Fisher | 464/93 |
| 1,352,953 | 9/1920 | Grundy | 464/87 |
| 1,725,109 | 8/1929 | Starkeu | 192/41.5 |
| 2,147,282 | 2/1939 | Cotchett | 464/60 |
| 2,567,663 | 9/1951 | Deubel | 464/60 |
| 3,662,568 | 5/1972 | Kashima et al. | 464/93 |
| 3,837,179 | 9/1974 | Bath | 464/182 |
| 3,884,049 | 5/1975 | Pauli | 464/182 |
| 4,228,664 | 10/1980 | McCoy | 464/92 |
| 4,942,856 | 7/1990 | Jaki et al. | 464/92 |
| 5,564,981 | 10/1996 | Iwabuchi et al. | 464/92 |
| 5,598,913 | 2/1997 | Monahan et al. | |

FOREIGN PATENT DOCUMENTS

| | | | |
|---|---|---|---|
| 551506 | 4/1923 | France | 464/57 |
| 74887 | 7/1932 | Sweden | 464/60 |

*Primary Examiner*—Eileen Dunn Lillis
*Attorney, Agent, or Firm*—Harness, Dickey & Pierce PLC

[57] ABSTRACT

In accordance with the teachings of the present invention, a flexible coupling assembly installed between a driving member and a driven machine or device. The flexible coupling assembly includes a one-way over-running clutch mechanism incorporated therein and transfers torque from the driving member to the driven device, while compensating for any angular and offset misalignment between two coupling members. The clutch mechanism provides driving torque in one rotational direction and over-running capability in the other, thereby accommodating large torque fluctuations from the driving member. This clutch mechanism is integrated within an intermediate housing assembly that is easily coupled between two jaw-type shaft couplings. Because the present invention eliminates the need for an intermediate shaft between the flexible coupling and a separate clutch mechanism, it further simplifies the installation of the assembly while reducing the overall space required.

18 Claims, 4 Drawing Sheets

ONE-WAY OVER-RUNNING FLEX COUPLING

BACKGROUND OF THE INVENTION

1. Field of the Invention

This invention relates to flexible couplings between an output shaft of a motor and an input shaft of a driven device. More specifically, this invention relates to flexible couplings with a one-way over-running clutch between the motor drive shaft and the driven device.

2. Discussion

Flexible couplings are used for transferring torque from output or drive shafts of an electrical motor or internal combustion engine to input shafts of various machines or devices, such as fans, packaging machines or pumps. Both the driving shaft and driven shaft are attached to jaw-type coupling members that have interlocking extensions to couple the motor to the machine. A typical flexible coupling has an elastomeric coupling "spider" placed between these input and output coupling members. The spider is a flexible element with several legs, each of which fits between the pairs of adjacent "teeth" of the coupling members, which provides the unit with a degree of flexibility during operation, while still transferring the torque from the driving shaft to the driven shaft. The coupling teeth allow for any axial offset while the flexibility of the spider reduces additional loads due to any angular mis-alignment between the motor and driven device. Without such a coupling, severe loading of the bearings in the motor or engine or in supportive "pillow blocks" could occur, causing reliability and durability problems.

During vibratory conditions that occur with certain driving means, such as internal combustion engines, the engine may have sudden large torque fluctuations. It is therefore desired to allow the driving shaft rotation to decelerate or even stop, relative to the driven shaft, while the driven shaft continues to rotate under the built up inertia of the driven device. In order to accomplish this, a clutch assembly is required between the output shaft of the motor and the input shaft of the driven device. This allows the driving shaft to stop, or even reverse direction, without suddenly stopping the rotation of the driven shaft. The driven device can then slow down under its own inertia, which avoids submitting the motor or engine to the sudden forces encountered in overcoming the substantial amount of inertia built up in the driven device.

Several one-way clutches or drives have been developed for use in other applications. For example, a one-way wrap spring clutch is disclosed in U.S. Pat. No. 5,598,913, issued to Monahan et al. The one-way over-running clutch pulley disclosed therein is applied to the rotational input shaft of the alternator, or other pulley driven device, and accommodates the inertia built up within an accessory and thereby cures the slipping and squealing of the belt when there is a large sudden deceleration of the engine.

Typically, a flexible coupling system includes a separate one-way drive or clutch which must be installed apart from the jaw-type coupling. An intermediate shaft is required, and in some cases, extra couplings to allow for additional misalignment and pillow blocks for support of one or more of the shafts may also be required. To reverse the direction of the one-way drive, the entire assembly must be dismantled. Therefore, the previous systems are complicated, expensive, and may also require a large physical space in which to include all of the necessary components.

In view of the foregoing attributes of the prior art devices, there exists a need in the art for an improved clutch assembly for use in a flexible coupling between an output shaft of a motor and a driven shaft of a machine.

It is therefore a primary object of this invention to fulfill that need by providing a flexible coupling with a clutch assembly that can be easily incorporated between the coupling members of the flexible coupling, reducing installation costs and complexity.

It is a further object of this invention to provide a flexible coupling that has a clutch assembly integrated therein such that it has generally the same overall dimensions as a conventional flexible coupling.

It is another object of this invention to provide a flexible coupling with an integrated clutch assembly so that the assembly does not require an intermediate shaft or additional shaft supports.

It is yet another object of this invention to provide a flexible coupling with a clutch assembly that is easily assembled and serviced.

SUMMARY OF THE INVENTION

Briefly described, these and other objects are accomplished according to the present invention by providing a flexible coupling assembly with a one-way over-running clutch mechanism that is integrated within the flexible coupling. The flexible coupling connects an electric motor (or other driving member) to a rotationally driven device such that misalignment loads on the bearings of the motor are reduced. The purpose of the one-way clutch is to allow the driven equipment to over-run the driving motor, or to freewheel in the opposite direction relative the driving motor. While the flexible coupling of the present invention is discussed in connection of an electric motor and a driven device, it can easily be seen that it has general application to any assembly involving a rotational driving shaft between a driving member and a driven member.

The flexible coupling of the present invention includes first and second coupling members, two elastomeric coupling spiders and a cylindrical intermediate assembly containing a bearing assembly and clutch mechanism. The clutch assembly may be one of a variety of mechanisms, such as, but not limited to, wrap spring, sprag, or roller/ramp clutches. Because the clutch assembly is integrated within the flexible coupling, the overall dimensions of the coupling assembly are only increased a minimal amount over a conventional flexible coupling. Therefore, the overall space required for the flexible coupling of the present invention is significantly less than that required for a conventional flexible coupling and a separate clutch assembly.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE PREFERRED EMBODIMENT

Figure 1:
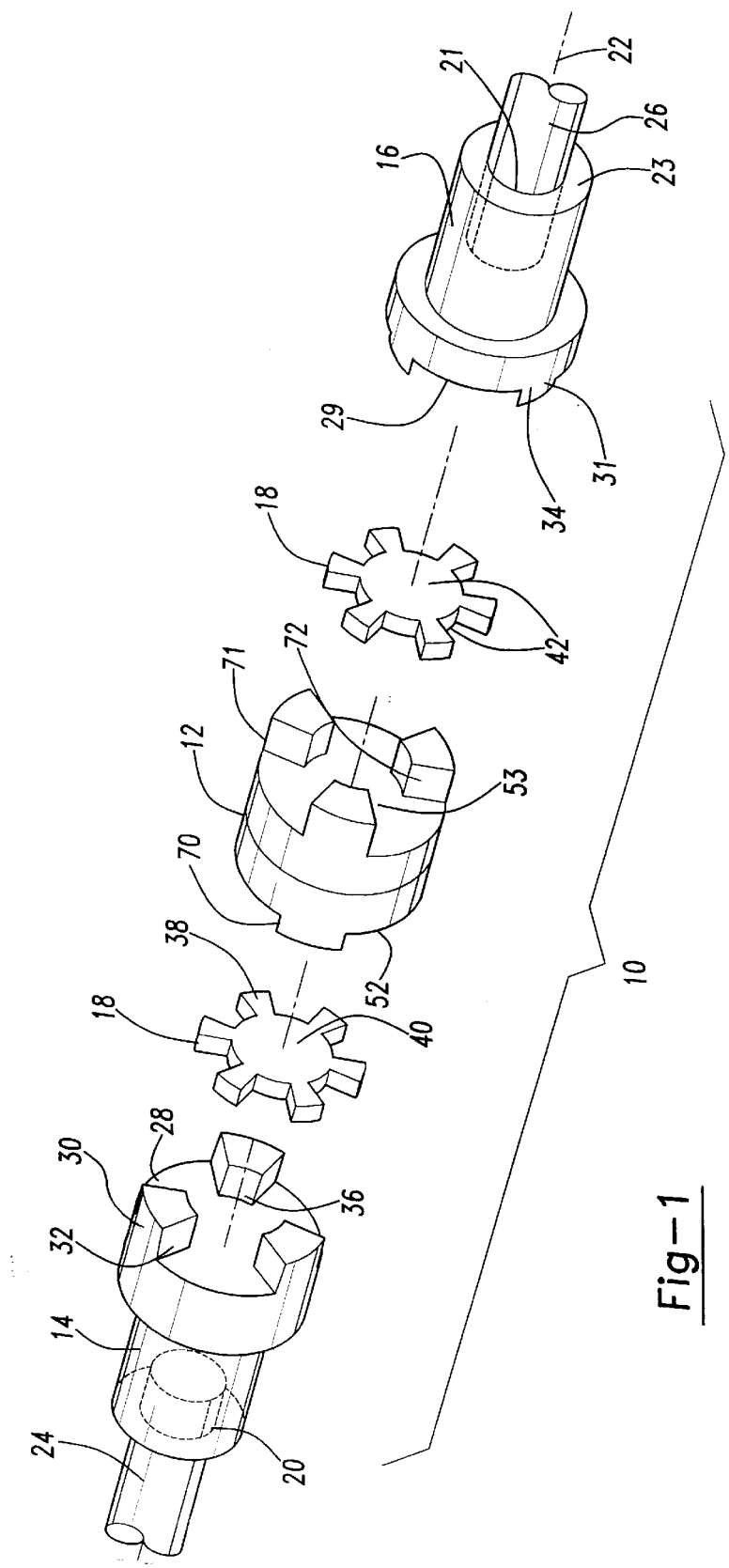
FIG. 1 is an exploded view of the preferred embodiment of the present invention.

Referring now in detail to the drawings, there is shown in FIG. 1 an exploded view of the preferred embodiment of the present invention. The flexible coupling assembly, shown generally as 10, includes an intermediate housing assembly 12 located between first and second coupling members 14 and 16, with an elastomeric coupling element or "spider" 18 (hereinafter referred to as a coupling spider) between the intermediate assembly 12 and each coupling member 14 and 16. The flexible coupling assembly 10 is attached at one end to a rotational input or driving member and at the other end to a rotationally driven device. The driving member may be an electric motor, internal combustion engine, or any other driving device capable of providing a rotational input to the coupling assembly 10.

Each of the coupling members 14 and 16 have a bore 20 and 21 along the center axis 22 of one end 23 into which a rotational shaft is received. The diameter of the bores 20 and 21 are such that each bore 20 and 21 is slightly larger than the diameter of the desired driving shaft 24 of the driving motor (not shown) and driven shaft 26 of the driven machine (not shown), respectively. The attachment of the coupling members 14 and 16 to the driving and driven shafts 24 and 26 is not critical to this invention. However, clearly any number of known means for attachment that prevent relative rotation between the coupling members and their respective shafts can be applied according to the teachings of the present invention. Alternate methods include, but are not limited to, a shaft with a key or ridge along its outer surface corresponding to a keyway in the bore, corresponding splines on the shaft and bore, a set screw or coupling pin, or a shaft and bore of corresponding non circular cross-sectional shapes.

Figure 4:
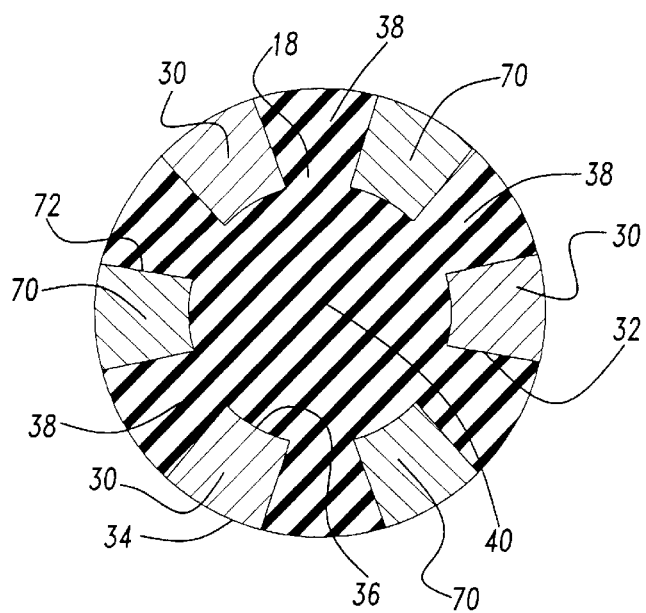
FIG. 4 is a cross-sectional view of the coupling teeth and spider taken generally along line 4—4 in FIG. 3.

Opposite the shaft end 23, the coupling members 14 and 16 each have a coupling surface 28 and 29 that is generally flat except for three "teeth" or extensions 30 and 31 protruding axially therefrom. The extensions 30 and 31 are spaced equidistantly apart on the coupling surface 28 and 29, and are generally wedge shaped, with their side edges 32 tapering radially inward so that the outer edges 34 of the extensions are wider than the inner edges 36, as best shown in FIG. 4. However, more or less than three extensions, which may be of varying shape and spaced non-equidistantly apart, are clearly within the scope of the present invention.

The two coupling spiders 18 are made of rubber, polyurethane or other elastomeric material and have six legs 38 extending radially outward from a center portion 40. In an alternate embodiment where the coupling members may have more or less than three extensions, the quantity of the legs 38 may be more or less, but is generally equal to twice the quantity of the extensions 30 and 31 protruding from each coupling member. Both end surfaces 42 of each coupling spider 18 are generally flat, with the length between the end surfaces 42 being substantially the same as the axial length of the extensions 30 and 31 on the coupling members 14 and 16. In the preferred embodiment, the legs 38 are of a constant width. However, in an alternate embodiment where the shape and spacing of the extensions on the coupling members varies, the legs 38 of the spiders 18 will also vary accordingly, as detailed below.

The intermediate assembly 12 is generally cylindrical and is comprised of two end portions, more specifically a clutch envelope 44 and a clutch hub 46, which have open ends 48 and 50, respectively, and coupling surfaces 52 and 53 opposite the open ends 48 and 50. The clutch envelope 44 and clutch hub 46 each have substantially smooth and flat surfaces 54 and 56 at their open ends 48 and 50 through which inner cylindrical surfaces 58 and 60 are formed with substantially equal diameters. Extending axially from its flat surface 54, the clutch envelope 44 further includes a cylindrical axial extension 62 along its outer surface 64 which forms a second inner cylindrical surface 65 having a greater diameter than its inner cylindrical surface 58. The clutch hub 46 on the other hand has a cylindrical recess 66 on its outer surface 68 which forms an intermediate cylindrical surface 69. This intermediate cylindrical surface 69 has a diameter that is greater than the inner cylindrical surface 60, but slightly less than the diameter of the second inner cylindrical surface 65 of the clutch envelope 44.

The coupling surfaces 52 and 53 on the clutch envelope 44 and clutch hub 46 are substantially identical and are generally flat with a plurality of extensions 70 and 71 spaced equidistantly apart protruding therefrom. The extensions 70 and 71 are substantially the same quantity and length as the extensions 30 and 31 on the coupling members 14 and 16 and similarly include radially inward tapering edges 72. Again, in an alternate embodiment having a different quantity of extensions on either of the coupling members, the number of extensions on each end portion is equal to the number of extensions on the corresponding coupling member. Furthermore, where the shape and spacing of the extensions on the coupling members differs from the preferred embodiment, the shape and spacing of the extensions 70 and 71 must be adapted accordingly, as detailed below.

Figure 2:
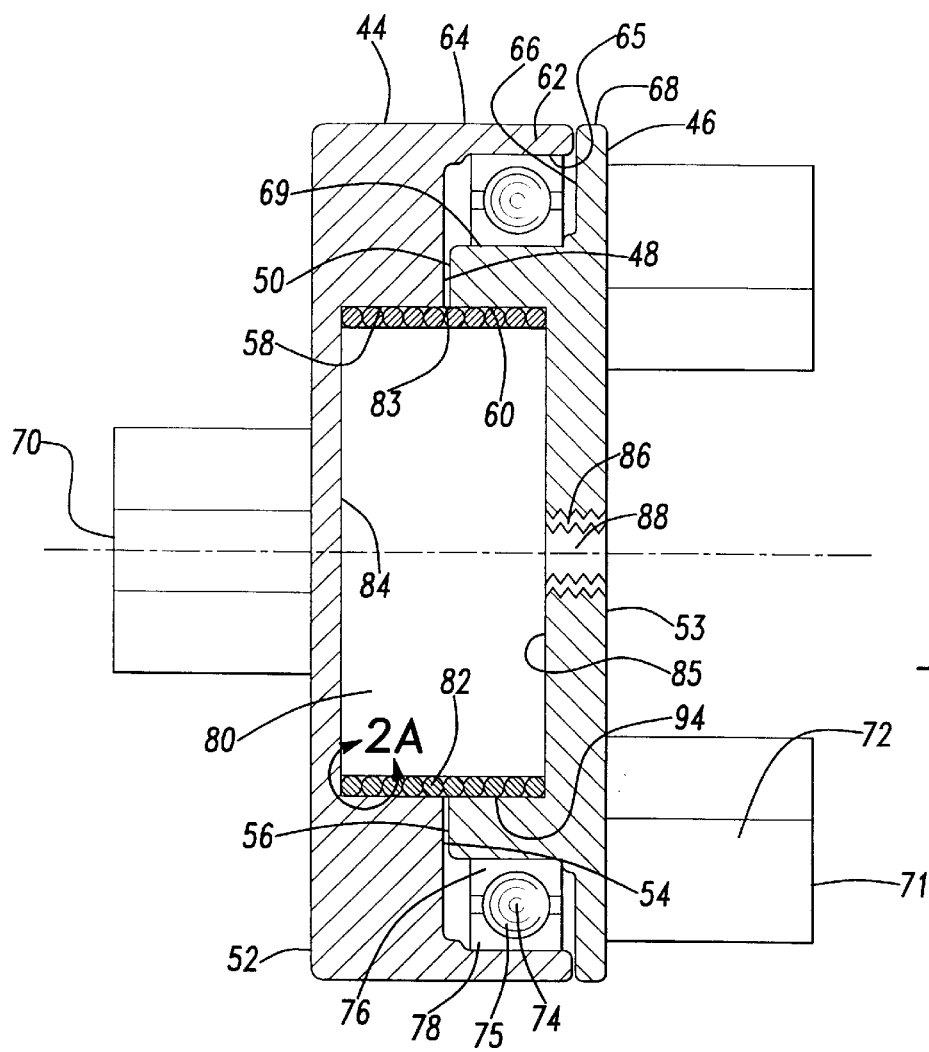
FIG. 2 is a cross-sectional view of the intermediate assembly taken along a line generally bisecting the assembly.
Figure 2A:
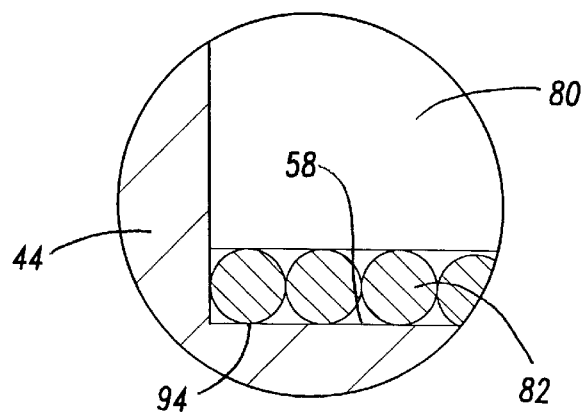
FIG. 2a is an alternate view of the region A—A with a spring of circular cross-section incorporated within the housing assembly.

The clutch envelope 44 and clutch hub 46 are press fit together around a rolling element bearing assembly 74 with inner and outer races 76 and 78 and a rolling element 75 to form the intermediate assembly 12. As shown in FIG. 2, the axial extension 62 overlaps the rolling element bearing assembly 74 and cooperates with the corresponding recess 66 to secure the rolling element bearing assembly 74 therebetween. The smooth flat surfaces 54 and 56 are formed such that there is no contact between the clutch envelope 44 and the clutch hub 46 except through the rolling element bearing assembly 74. Because there is no direct contact between the clutch envelope 44 and the clutch hub 46, the rolling element bearing assembly 74 allows relative rotation between the two end portions. The rolling element bearing assembly 74, which is illustrated as a ball bearing 75, is located between inner and outer races 76 and 78, where the inner race 76 is secured to the intermediate cylindrical surface 69 on the recess 66 of the clutch hub 46 and the outer race 78 is secured along the inner cylindrical surface 65 of the cylindrical axial extension 62. While not shown, the bearing 75 is permanently sealed so that additional lubrication over its useful life is not necessary. The arrangement of the bearing assembly around the clutch envelope 44 and clutch hub 46 also allows the bearing seals to function as the seals for the clutch assembly so that no additional seals are required. Obviously, other varieties of bearings, journal bearings for example, could be used in the present invention.

When the clutch envelope 44 and the clutch hub 46 are pressed together, the inner cylindrical surfaces 58 and 60 are coaxial with substantially the same diameters so that they define a cylindrical cavity 80 for receiving a clutch spring 82. This is best shown in FIG. 2. The two inner cylindrical surfaces 58 and 60 form a common cylindrical surface 83 which defines the spring receiving cavity 80. The spring receiving cavity 80 further includes end walls 84 and 85 on the clutch envelope 44 and clutch hub 46, respectively.

Figure 3:
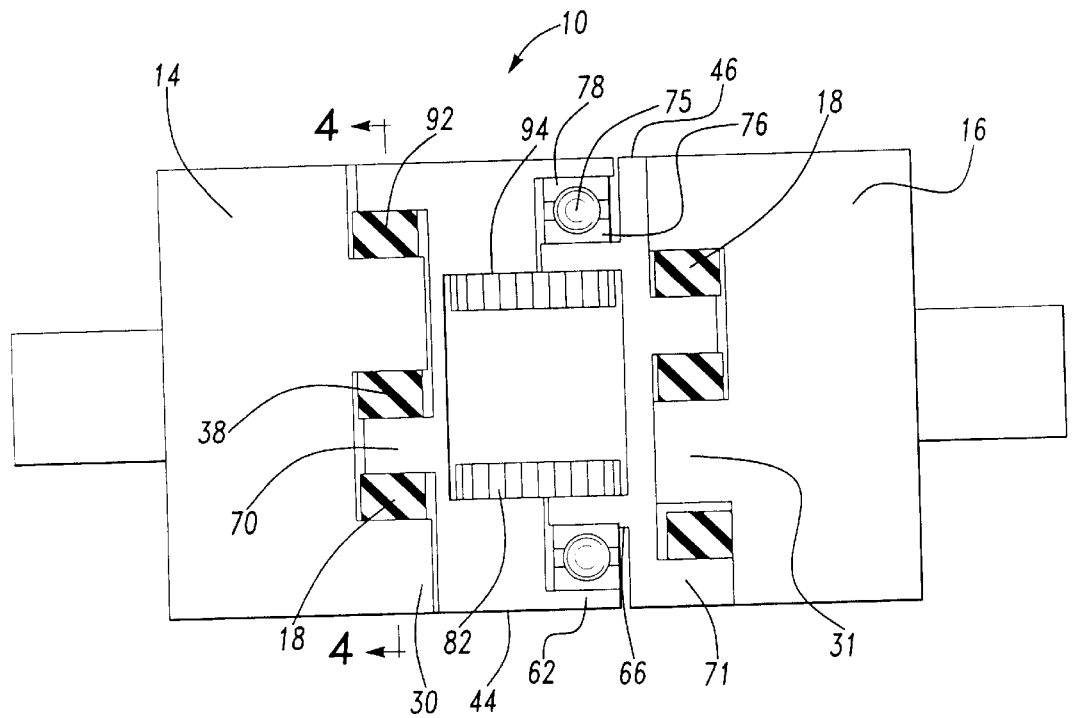
FIG. 3 is a plan view of the preferred embodiment in its fully assembled state.

The clutch spring 82 is located within the spring receiving cavity 80 and is a coil or wrap spring which, in its uncompressed or free standing condition, has a diameter which is slightly greater than the diameter of the common cylindrical surface 83. When received in the cavity 80, the spring 82 frictionally engages with and exerts a radially outward normal force on both of the inner cylindrical surfaces 58 and 60. The spring 82 is shown in FIG. 2 as having a circular cross-section. However, alternate embodiments, including a spring of rectangular cross-section, as shown in FIG. 3, oval or other shaped cross-section, are clearly envisioned to be within the scope of the present invention.

The clutch hub 46 may further include a threaded hole 86 through its coupling surface 53 and end wall 85 into the partial cavity defined by its inner cylindrical surface 60. This hole 86 allows air to escape as the two end portions 44 and 46 are pressed together to prevent pressurizing the spring receiving cavity 80, and allows for the introduction of grease after assembly, for example during routine maintenance of the flexible coupling 10. A threaded plug 88 threads into the hole 86 to seal the spring receiving cavity 80 and contain lubricant (not shown) for the clutch spring 82 therein. This prevents the lubricant from leaking out or being contaminated by foreign materials, which in turn prolongs the life of the clutch mechanism.

The threaded hole 86 also assists in separating the two end portions 44 and 46 after the intermediate assembly 12 is pressed together. This is necessary when the unit requires servicing, as may be the case if, for example, the spring 82 breaks inside the cavity 80, or when reversal of the driving direction of the clutch mechanism is desired. To separate the end portions 44 and 46, a threaded bolt (not shown) is inserted through the hole 86 so that its threaded end contacts the end wall 84 of the cavity 80 on the clutch envelope 44. As the bolt is tightened, the threaded end pushes against the clutch envelope 44, forcing the two end portions apart. Reversal of the driving direction is then accomplished by replacing the spring 82 with an opposite wound spring (not shown). Although the threaded hole 86 is described as being only through the clutch hub 46, clearly, the scope of the present invention includes such a threaded hole on either the clutch hub 46 or clutch envelope 44, or both.

After the clutch envelope 44 and the clutch hub 46 are pressed together, their coupling surfaces 52 and 53 are located at opposite ends of the intermediate assembly 12 with the extensions 70 and 71 being thereby directed in opposite axial directions. The intermediate assembly 12 is then axially aligned with the driving and driven coupling members 14 and 16 so that the extensions 70 and 71 on the clutch envelope 44 and on the clutch hub 46 insert between the extensions 30 and 31 on the coupling members 14 and 16. Prior to coupling the intermediate assembly 12 to the coupling members 14 and 16, the coupling spiders 18 are inserted between the components which results in a leg 38 of the coupling spider 18 being between each pair of adjacent extensions 30 and 70, and 31 and 71. This is best shown in FIG. 3, which shows the completed assembly 10, with the extensions 70 and 71 on each end portion 44 and 46 engaging the legs 38 of the coupling spiders 18 and thereby engaging the extensions 30 and 31 on each coupling member 14 and 16. As seen in FIG. 3, the outer surfaces 92 of the legs 38 are visible between each adjacent pair of extensions 30 and 70, and 31 and 71, and the legs 38 are formed such that they fit firmly in place between the adjacent pairs of extensions 30 and 70, and 31 and 71, contacting the tapered edges 32 and 72 of the extensions 30, 31, 70 and 71, and filling the gaps therebetween. As mentioned above, in alternate embodiments where the extensions on either component are not spaced equidistantly apart or are not wedge shaped, the extensions on the corresponding component and the legs of the spiders must be adapted accordingly. In any embodiment of the present invention, the extensions on the coupling members must correspond to and engage the legs of the spider and the corresponding extensions on the intermediate assembly 12, thereby functioning as a means for connecting the driving shaft to the intermediate housing and finally to the driven shaft.

The generally flat coupling surfaces 28 and 52, and 29 and 53 cooperate with the flat end surfaces 42 of the coupling spiders 18 so that the components couple firmly together. The elasticity of the coupling spider 18 and any clearance gaps between the coupling spider 18 and the extensions 30, 31, 70 and 71 provide the flexibility of the coupling assembly 10 by compressing or flexing to accommodate for angular misalignment of the drive and driven shafts, while also transferring the torque from the driving coupling member 14 through the intermediate assembly 12 to the driven coupling member 16. This reduces any angular misalignment or offset loads that may be applied to the motor bearings (not shown) if the two shafts 24 and 26 are not aligned. Furthermore, the lengths of the extensions 30, 31, 70 and 71 compensate for axial offset between the coupling surfaces 28 and 52, and 29 and 53 by allowing the coupling assembly to remain fully functional when there are small gaps between the flat ends of the coupling spider 18 and the flat coupling surfaces of the coupling members 14 and 16 and/or the intermediate assembly 12.

The coupling surfaces 52 and 53 and extensions 70 and 71 of the clutch envelope 44 and clutch hub 46 are substantially the same so that the intermediate assembly 12 can be installed in either direction between the coupling members. For example, the clutch envelope 44 can be coupled with either the driving coupling member 14 or the driven coupling member 16 with no change in overall performance of the flexible coupling assembly 10. To simplify the description of the present invention, however, the assembly is generally described with the clutch envelope 44 coupling with the driving coupling member 14.

The identical coupling surfaces 52 and 53 of the clutch envelope 44 and clutch hub 46 simplifies installation of the flexible coupling because there is not a concern as to which direction each end must face. Furthermore, it is easier to match the intermediate assembly 12 of the present invention to existing flexible coupling components. Coupling members and corresponding coupling spiders are typically obtained as a matched set whose legs and extensions cooperate with one another. The coupling surfaces of the intermediate assembly can be selected to match the coupling surfaces of existing coupling members so the intermediate assembly can easily be applied to an existing system. This avoids having to acquire separate coupling members and coupling spiders for each end of the intermediate assembly, which would be more costly and further complicate the assembly process. An additional benefit of using a matched set of coupling members is that the system can easily be made operable if the intermediate assembly 12 fails and has to be temporarily removed for service, as the two coupling members 14 and 16 can then be extended to engage each other in the absence of the intermediate assembly 12.

During operation, either the clutch envelope 44 or the clutch hub 46 may be driven by the driving coupling member 14, which is driven by the driving shaft 24 of the motor or internal combustion engine. As mentioned above, to simplify the discussion, the clutch envelope 44 is described as coupling with the driving coupling member 14. Rotation of the driving shaft 24 therefore causes a corresponding rotation of the clutch envelope 44. If the clutch envelope 44 is accelerated relative to the clutch hub 46 in the driving direction, the intermediate assembly 12 of the present invention will transfer torque from the clutch envelope 44 to the clutch hub 46 and subsequently to the driven shaft 26 and finally to the driven device or machine. When the clutch envelope 44 is significantly decelerated relative to the rotational speed of the clutch hub 46, the intermediate assembly 12 of the present invention allows for the clutch hub 46 to over-run or rotate relative to the clutch envelope 44 as the inertia from the driven device prevents the clutch hub 46 from decelerating as fast as the clutch envelope 44. Previously, where no over-running occurred in the flexible coupling itself, the deceleration of the motor and the inertial over-running of the driven device subjected the motor to additional stress as the motor had to overcome the built up inertia within the driven device as it slowed.

In the preferred embodiment of the present invention, torque is transferred and slip is permitted because of the operation of the coil spring 82 within the spring receiving cavity 80 of the intermediate assembly 12. To provide these complementary functions, the coil spring 82 is oriented in the cavity 80 so that it is "wound" in a direction which fosters the transmission of torque while still permitting slip. The winding of the spring 82 is such that when the clutch envelope 44 is positively driving or accelerating relative to the clutch hub 46, the frictional engagement of the spring 82 with the inner cylindrical surface 58 of the clutch envelope 44 will cause the spring to experience compressive loading or unwinding. As the coil spring 82 is unwound, its freestanding outer diameter would effectively increase if it were not restrained by the inner cylindrical surfaces 58 and 60. The frictional forces between the inner cylindrical surfaces 58 and 60 and the coils or volutes of the spring 82 result in increased compressive forces being built-up in the spring 82 along the helix of the spring thereby increasing the radially outward normal force being exerted on both the inner cylindrical surfaces 58 and 60 of the clutch envelope 44 and clutch hub 46. As the normal force increases, the effect of the spring 82 is to lock the clutch envelope 44 to the clutch hub 46, fostering the transfer of torque from the driving shaft 24 to the driven shaft 26. Additionally, by having the spring 82 engage the inner cylindrical surfaces 58 and 60 of the clutch envelope 44 and clutch hub 46, centrifugal forces induced by rotation of the intermediate assembly 12 are utilized to further enhance and increase the radially outward normal force exerted by the spring 82. One additional benefit of this engagement between the exterior surface 94 of the spring 82 and the interior cylindrical surfaces 58 and 60 is that any lubricants used with the spring 82 are retained on the spring 82 under the influences of the centrifugal forces and are not drawn away.

When the speed of the driving shaft 24 is reduced, the inertia acting on the driven shaft 26 causes the clutch hub 46 to over-run the clutch envelope 44. The winding direction of the spring 82 causes the effective outer diameter of the spring 82 to slightly reduce as the spring 82 "winds-up". Corresponding with this reduction in the effective outer diameter of the spring 82, the frictional forces between the inner cylindrical surfaces 58 and 60 and the coils of the spring 82 result in a decrease of the compressive forces along the helix of the spring 82 which can produce a decrease in the radially outward normal force exerted by the spring 82 on the inner cylindrical surfaces 58 and 60. This in turn "unlocks" the inner cylindrical surfaces 58 and 60 from each other and the clutch hub 46 is permitted to over-run and rotate relative to the clutch envelope 44.

Although the preferred embodiment includes the one-way over-running clutch as disclosed in U.S. Pat. No. 5,598,913, and discussed above, clearly the scope of the present invention includes other clutch assemblies that are capable of being incorporated into the intermediate assembly or coupling member of the flexible coupling assembly of the present invention. Examples of other clutch assemblies include, but are not limited to, sprag and roller/ramp clutches.

Figure 5:
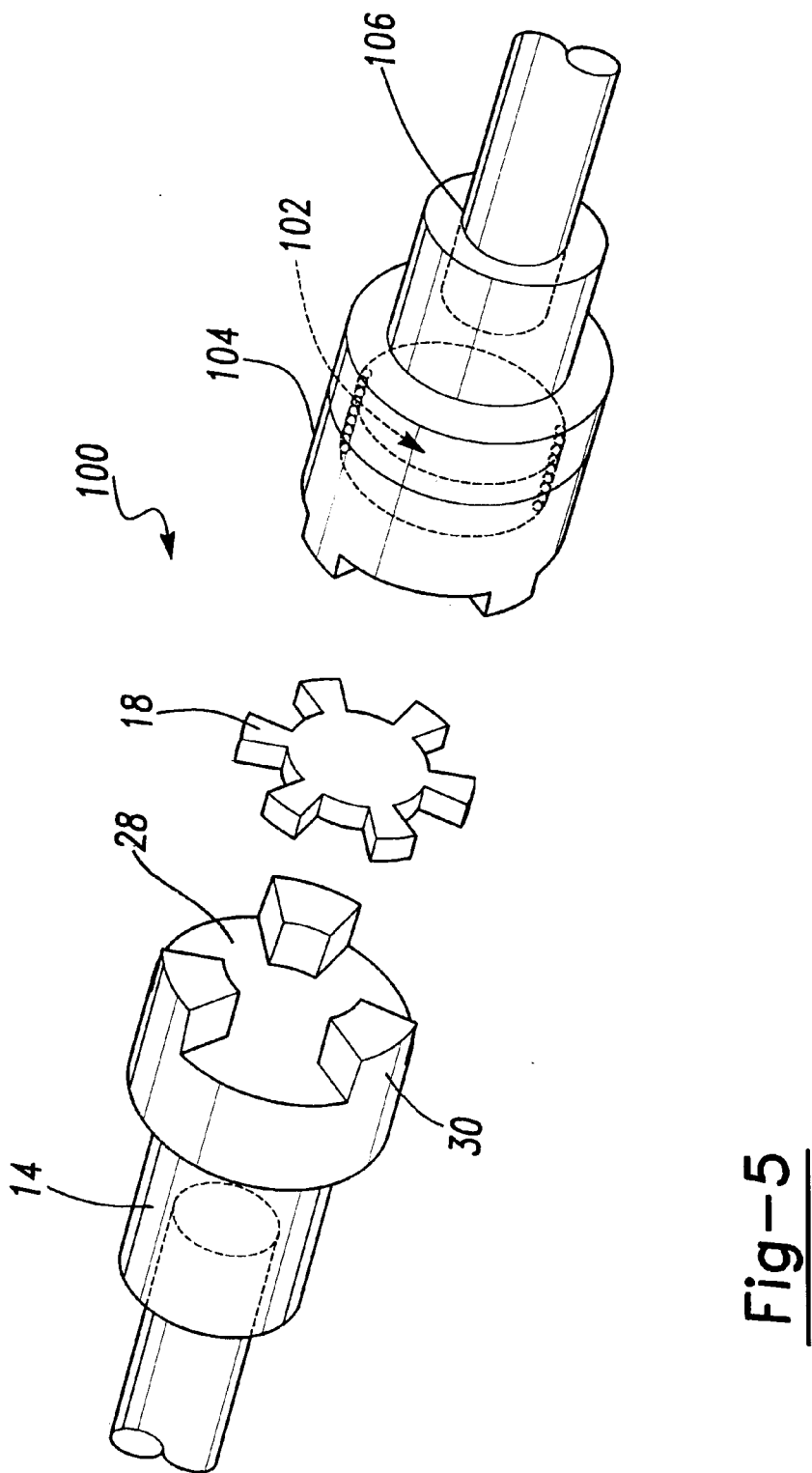
FIG. 5 is an exploded view of an alternate embodiment having the clutch assembly incorporated within one of the coupling members.

In the preferred embodiment, the clutch spring 82 is incorporated within the intermediate assembly 12. As mentioned above, this allows the clutch assembly to be applied to various applications with minimal cost. The intermediate assembly can be matched with corresponding coupling members that have the appropriate diameter bore therethrough to fit between the intermediate assembly and any desired driving shaft and driven shaft. Replacing existing coupling members 14 and 16 to adapt the clutch assembly to the application is much less costly than replacing the entire intermediate assembly 12. However, an alternate embodiment, shown generally as 100 in FIG. 5, could incorporate the clutch assembly 102 into one of the coupling members 104. The clutch coupling member 104 may then be installed on either the driving shaft 24 or driven shaft 26, as long as the selected shaft is of substantially the same diameter and shape of the bore 106 in the coupling member 104. The alternate assembly 100 eliminates the need for a separate intermediate housing assembly and further eliminates one of the two coupling spiders 18 that are present in the preferred embodiment. The remaining elements and operation of the flexible coupling assembly 100 are otherwise the same as the preferred embodiment discussed above.

While the above description constitutes the preferred embodiment of the present invention, it will be appreciated that the invention is susceptible to modification, variation and change without departing from the proper scope and fair meaning of the accompanying claims.

What is claimed is:

1. A flexible coupling assembly for transferring power between a first rotational member and a second rotational member, said assembly comprising:

a housing assembly defining a first end portion and a second end portion, said first end portion connected to said second end portion to permit relative rotation therebetween;

one-way clutch means for causing said first and second end portions to rotate together when said first end portion rotates in a first direction relative said second end portion, thereby enabling the transfer of torque between the first and second rotational members, said one-way clutch means further allowing said second end portion to rotate relative said first end portion when the first rotational member rotates in a second direction relative said second end portion, said second direction being opposite said first direction;

first connecting means for connecting said first end portion to the first rotational member and causing rotation thereof, said first connecting means allowing for relative axial displacement and angular misalignment between the first and second rotational members; and second connecting means for connecting said second end portion to the second rotational member and causing rotation thereof.

2. The flexible coupling assembly of claim 1 wherein said housing assembly first end portion and said housing assembly second end portion define an inner cylindrical cavity within said housing assembly, said cylindrical cavity further defining an inner cylindrical surface with a common diameter, said one-way clutch means comprising a spring wound within said cylindrical cavity and having a free standing outer diameter greater than said common diameter of said inner cylindrical surface, said spring frictionally engaging said inner cylindrical surface such that said spring is retained in engagement therewith by a radially outward normal force exerted by said spring, said spring being oriented in a direction such that rotation of said first end portion in said first direction relative to said second end portion causes an increased outward normal force to be exerted against said inner cylindrical surface, whereby said first and second end portions are prevented from rotating relative to one another and torque is transferred between said first and second rotational members, said spring also being oriented such that rotation of said first end portion in said second direction relative to said second end portion can cause a decreased outward normal force to be exerted by said spring on said inner cylindrical surface thereby permitting said first and second end portions to rotate relative to one another and allowing said second end portion to overrun said first end portion.

3. The flexible coupling assembly of claim 2 wherein one of said end portions includes a threaded hole axially therethrough, said hole allows air to escape as said first and second end portions are attached and further allows lubricant to be introduced into said cylindrical cavity, said hole receives a threaded plug to seal the lubricant within said cylindrical cavity.

4. A flexible coupling assembly for transferring power between a first rotational member and a second rotational member, said assembly comprising:
   a housing assembly defining a first end portion and a second end portion, said first end portion connected to said second end portion to permit relative rotation therebetween;
   one-way clutch means for causing said first and second end portions to rotate together when said first end portion rotates in a first direction relative said second end portion, thereby enabling the transfer of torque between the first and second rotational members, said one-way clutch means further allowing said second end portion to rotate relative said first end portion when the first rotational member rotates in a second direction relative said second end portion, said second direction being opposite said first direction;
   first connecting means for connecting said first end portion to the first rotational member and causing rotation thereof, said first connecting means includes a first elastomeric coupling element having a plurality of legs extending radially outward therefrom, and a first coupling member having first attachment means for attaching to the first rotational member and causing rotation thereof and a plurality of extensions protruding axially opposite said first attachment means, wherein said first end portion includes extensions protruding axially therefrom, said extensions on said first end portion correspond to and engage said legs on said coupling element and said extensions on said first coupling member so that torque is transferred from the first rotational member to said first end portion; and second connecting means for connecting said second end portion to the second rotational member and causing rotation thereof.

5. The flexible coupling assembly of claim 4 wherein said second connecting means includes a second elastomeric coupling element having a plurality of legs extending radially outward therefrom, and a second coupling member having second attachment means for attaching to the second rotational member and causing rotation thereof and a plurality of extensions protruding axially opposite said second attachment means, wherein said second end portion includes axial protruding extensions so that said housing assembly has extensions protruding axially from opposite ends, said extensions on said second end portion correspond to and engage said legs on second coupling element and said extensions on said second coupling member, thereby coupling said housing assembly to the second rotational member and causing rotation thereto.

6. The flexible coupling assembly of claim 5 wherein said extensions on said second end portion are substantially the same as said extensions on said first end portion so that said housing assembly is generally reversible between the first and second coupling members.

7. The flexible coupling assembly of claim 4 wherein the first rotational member is a rotational driving shaft connected to a rotational input device.

8. The flexible coupling assembly of claim 4 wherein the second rotational member is a rotational driving shaft connected to a rotational input device.

9. The flexible coupling assembly of claim 4 wherein said first end portion rotates relative said second end portion along a rolling element bearing assembly secured therebetween.

10. The flexible coupling assembly of claim 4 wherein said housing assembly first end portion and said housing assembly second end portion define an inner cylindrical cavity within said housing assembly, said cylindrical cavity further defining an inner cylindrical surface with a common diameter, said one-way clutch means comprising a spring wound within said cylindrical cavity and having a free standing outer diameter greater than said common diameter of said inner cylindrical surface, said spring frictionally engaging said inner cylindrical surface such that said spring is retained in engagement therewith by a radially outward normal force exerted by said spring, said spring being oriented in a direction such that rotation of said first end portion in said first direction relative to said second end portion causes an increased outward normal force to be exerted against said inner cylindrical surface, whereby said first and second end portions are prevented from rotating relative to one another and torque is transferred between said first and second rotational members, said spring also being oriented such that rotation of said first end portion in said second direction relative to said second end portion can cause a decreased outward normal force to be exerted by said spring on said inner cylindrical surface thereby permitting said first and second end portions to rotate relative to one another and allowing said second end portion to overrun said first end portion.

11. The flexible coupling assembly of claim 10 wherein said spring has a rectangular cross section.

12. The flexible coupling assembly of claim 10 wherein said spring has a generally circular cross section.

13. The flexible coupling assembly of claim 10 wherein one of said end portions includes a threaded hole axially therethrough, said hole allows air to escape as said first and second end portions are attached and further allows lubricant to be introduced into said cylindrical cavity, said hole receives a threaded plug to seal the lubricant within said cylindrical cavity.

14. The flexible coupling assembly of claim 4 wherein said elastomeric coupling element is made of rubber.

15. The flexible coupling assembly of claim 4 wherein said elastomeric coupling element is made of polyurethane.

16. A flexible coupling assembly for transferring power between a first rotational member and a second rotational member, said assembly comprising:

a housing assembly defining a first end portion and a second end portion, said first end portion connecting to said second end portion and being rotatable relative thereto, said first end portion having extensions protruding axially therefrom, said second end portion having extensions protruding axially therefrom, said first and second end portions connect at ends opposite said extensions and cooperate to define a cylindrical cavity within said housing assembly, said cylindrical cavity having a common inner cylindrical surface with a common diameter;

a spring wound within said cylindrical cavity and having a free standing outer diameter greater than said diameter of said common inner cylindrical surface, said spring frictionally engaging said common inner cylindrical surface, said spring being oriented in a direction such that rotation of said first end portion in a first direction relative to said second end portion causes an increased outward normal force to be exerted against said common inner cylindrical surface, whereby said first and second end portions are prevented from rotating relative to one another and torque is transferred between said first and second rotational members, said spring also being oriented such that rotation of said first end portion in a second direction relative to said second end portion causes a decreased outward normal force to be exerted by said spring on said common inner cylindrical surface thereby permitting said second end portion to rotate relative to and overrun said first end portion, said second direction being opposite said first direction;

a first elastomeric coupling element having a plurality of legs extending radially outward therefrom;

a second elastomeric coupling element having a plurality of legs extending radially outward therefrom;

a first coupling member having first attachment means for attaching to the first rotational member and causing rotation thereof and a plurality of extensions protruding axially opposite said first attachment means, said extensions on said first end portion correspond to and engage said legs on said first coupling element and said extensions on said first coupling member so that torque is transferred from the first rotational member to said first end portion;

a second coupling member having second attachment means for attaching to the second rotational member and causing rotation thereof and a plurality of extensions protruding axially opposite said second attachment means, said extensions on said second end portion correspond to and engage said legs on said second coupling element and said extensions on said second coupling member, thereby coupling said housing assembly to the second rotational member and causing rotation thereto, said first and second coupling elements allowing for axial misalignment between the first and second rotational members.

17. The flexible coupling assembly of claim 16 wherein said extensions on said first coupling member are substantially similar to said extensions on said second coupling member.

18. The flexible coupling assembly of claim 16 wherein at least one of said end portions includes a threaded hole axially therethrough, said hole allows air to escape as said first and second end portions are attached and further allows lubricant to be introduced into said cylindrical cavity, said hole receives a threaded plug to seal the lubricant within said cylindrical cavity.

* * * * *